United States Patent
McKee

(10) Patent No.: US 8,505,633 B2
(45) Date of Patent: Aug. 13, 2013

(54) WEAKPOINT COUPLING OF SELECTIVELY ADJUSTABLE LOAD BEARING CAPACITY

(75) Inventor: L. Michael McKee, Friendswood, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 403 days.

(21) Appl. No.: 12/699,571

(22) Filed: Feb. 3, 2010

(65) Prior Publication Data
US 2010/0181077 A1   Jul. 22, 2010

Related U.S. Application Data

(63) Continuation-in-part of application No. 12/177,375, filed on Jul. 22, 2008, now Pat. No. 7,967,072.

(60) Provisional application No. 61/187,085, filed on Jun. 15, 2009.

(51) Int. Cl.
E21B 19/16 (2006.01)
F16D 9/08 (2006.01)

(52) U.S. Cl.
USPC .................. 166/377; 166/385; 285/2; 285/3; 285/4; 403/2

(58) Field of Classification Search
USPC ................ 166/377, 385; 285/2–4; 411/2–5; 403/2; 137/68.15
See application file for complete search history.

(56) References Cited

U.S. PATENT DOCUMENTS

| | | | |
|---|---|---|---|
| 1,982,915 A | 12/1934 | Jenks | |
| 2,083,054 A | 6/1937 | Cline | |
| 4,685,516 A | 8/1987 | Smith et al. | |
| 4,691,941 A * | 9/1987 | Rabushka et al. | 285/1 |
| 4,759,406 A | 7/1988 | Smith et al. | |
| 4,913,229 A | 4/1990 | Hearn | |
| 5,201,814 A | 4/1993 | Kitchell et al. | |
| 5,529,085 A * | 6/1996 | Richards et al. | 137/68.15 |
| 6,431,269 B1 | 8/2002 | Post et al. | |
| 6,789,627 B2 | 9/2004 | Leismer | |
| 7,114,563 B2 | 10/2006 | Rose | |
| 7,967,072 B2 | 6/2011 | McKee | |
| 2005/0230115 A1 | 10/2005 | Rose | |
| 2006/0113083 A1 | 6/2006 | Connell et al. | |

OTHER PUBLICATIONS

International Search Report issued in PCT/US2010/038626 on Feb. 8, 2011, 3 pages.
Written Opinion of the International Searching Authority issued in PCT/2010/038626 on Feb. 8, 2011, 3 pages.
Non-Final Office Action issued in related U.S. Appl. No. 12/177,375 on Jun. 4, 2010, 13 pages.
Final Office Action issued in related U.S. Appl. No. 12/177,375 on Nov. 26, 2010, 8 pages.

* cited by examiner

*Primary Examiner* — Giovanna Wright
(74) *Attorney, Agent, or Firm* — Michael Flynn; Timothy Curington; Robin Nava

(57) ABSTRACT

A coupling to serve as a logging head or other downhole weakpoint assembly. The coupling is configured with a variety of internal tensile members. The individual members and load bearing capacities of each may be selectively engaged in a variety of combinations so as to provide a host of different load bearing capacities to the weakpoint coupling. Such selectable engagement is achieved through the dialing of a key by the user without the need to add or remove any load bearing features from the coupling. Thus, the user-friendly nature of the coupling is enhanced and the possibility of the user leaving behind supplemental load bearing tensile members for change-out is eliminated.

22 Claims, 6 Drawing Sheets

WEAKPOINT COUPLING OF SELECTIVELY ADJUSTABLE LOAD BEARING CAPACITY

CROSS REFERENCE TO RELATED APPLICATION(S)

This Patent Document claims priority under 35 U.S.C. §119(e) to U.S. Provisional Application Ser. No. 61/187,085, entitled Selectable Weakpoint Release Device, filed on Jun. 15, 2009, and incorporated herein by reference in its entirety. The Document is also a continuation-in-part claiming priority under 35 U.S.C. §120 to U.S. application Ser. No. 12/177,375 entitled Logging Head Release Mechanism filed on Jul. 22, 2008 now U.S. Pat. No. 7,967,072, also incorporated herein by reference in its entirety.

FIELD

Embodiments described relate to the coupling of downhole tools to a well access line such as a wireline cable. In particular, embodiments of a weakpoint coupling incorporated into a head at the coupling of downhole tools to a well access line are detailed. The weakpoint coupling described may be selectively adjustable in terms of the amount of load bearing capacity it provides to the head. Thus, user-friendliness may be enhanced for the operator. Furthermore, the overall amount of equipment which may be required at the oilfield prior to attaining well access may be kept to a minimum.

BACKGROUND

Exploring, drilling, completing, and operating hydrocarbon and other wells are generally complicated, time consuming and ultimately very expensive endeavors. In recognition of these expenses, added emphasis has been placed on well access, monitoring and management throughout its productive life. Ready access to well information as well as well intervention may play critical roles in maximizing the life of the well and total hydrocarbon recovery. As a result, downhole tools are frequently deployed within a given hydrocarbon well throughout its life. These tools may include logging tools to provide well condition information. Alternatively, these tools may include devices for stimulating hydrocarbon flow, removing debris or scale, or addressing a host of other well issues.

The above noted downhole tools are generally delivered to a downhole location by way of a well access line, such as a wireline cable, drill pipe, coiled tubing, slickline, etc. Regardless, once positioned downhole at the end of the well access line, a well application may be employed by such a tool. A winch or other appropriate surface equipment may then be employed to withdraw the well access line and tool from the well. However, in many cases the tool may be stuck in place downhole. This may be due to the presence of an unforeseen obstruction, unaccounted for restriction, differential sticking of the tool against the well wall, a malfunctioning tractor, or a host of other reasons. Indeed, with the presence of increasingly deeper and more deviated wells, the likelihood of a downhole tool becoming stuck merely due to the depth and architecture of the well alone is increased.

Regardless of the particular reason for the sticking of the downhole tool, continued efforts to withdraw the line may lead to significant line or tool damage. Additionally, the risk of breaking the line at some intermediate location and leaving potentially several thousand feet of line in the well may be of concern. Thus, in order to help avoid a circumstance in which the line is broken, a release mechanism is generally incorporated into a head which serves as the connection between the downhole tool and the well access line. In this manner, surface equipment such as the noted winch, may continue to pull the line out of the well, leaving only the downhole tool and part of the head behind. A subsequent fishing application may take place in order to retrieve the tool and head.

A common release mechanism involves incorporating a "weakpoint" or separable housing into the noted head. The weakpoint is held together by at least one tensile stud. However, it may be broken once a predetermined load is applied. So, for example, consider a tensile stud providing a weakpoint of about a 2,000 lb. threshold to the head, which is in turn coupled to a tool that has become stuck in the well. In such a case, the head will break, freeing the well access line from the well once a pull exceeding about 2,000 lbs. is achieved.

Unfortunately, employing a tensile stud incorporated into the housing of the head requires that the tensile stud and load threshold be predetermined. That is, the most effective size of the threshold to be incorporated into the logging head may be dependent on a variety of factors. For example, the load threshold of the well access line itself, the potential sticking depth of the tool, and the overall size of the downhole toolstring may all play a role in determining the most effective tensile stud to use. As a practical matter, this means that a couple of different heads and between about 10 and 20 different tensile studs of different load thresholds, or "weakpoint" values, are generally made available at the oilfield. In spite of this large amount of equipment, only one of the tensile stud/head combinations is ultimately incorporated into the overall line assembly.

The inability to tailor a weakpoint value in a practical manner for a given head on-site, may lead to the compromising of operations. For example, often times, in an effort to minimize the amount of equipment brought to the site, an operator will bring fewer tensile studs to the site leaving fewer weakpoint values available. However, this runs the risk that the proper logging head will be unavailable on site adding significant delay to the operation or worse, the employment of an improper logging head of potentially catastrophic consequences. At a minimum, the operator is left with the option of hauling a significant number of unutilized studs to the site or risk the possibility of hundreds of thousands of dollars in lost time for failure to do so.

SUMMARY

A weakpoint coupling is provided for a downhole tool. The coupling includes a first portion for accommodating a plurality of tensile members. A second portion, generally oriented downhole of the first, may be configured for selectively engaging a combination of the tensile members. In this manner, one of a variety of different load bearing capacities may be provided to the coupling. Indeed, the combination may include the engagement of anywhere between a single tensile member and all tensile members of the coupling.

DETAILED DESCRIPTION

Embodiments are described with reference to certain downhole tool operations at an oilfield. For example, logging operations with a downhole logging tool in a well at an oilfield are described throughout. However, alternate downhole operations and tools may be utilized in conjunction with embodiments of a logging head or "weakpoint coupling" as described herein. Regardless, embodiments of the weakpoint coupling include a release mechanism that allows an operator to rotate a dial or key of the coupling in order to set a weakpoint threshold therefor. No load bearing components need to be added to, or removed from, the coupling in order to achieve the setting of the threshold. Furthermore, no power beyond the operator's turning of the key, is required in order to set the threshold.

Figure 1:
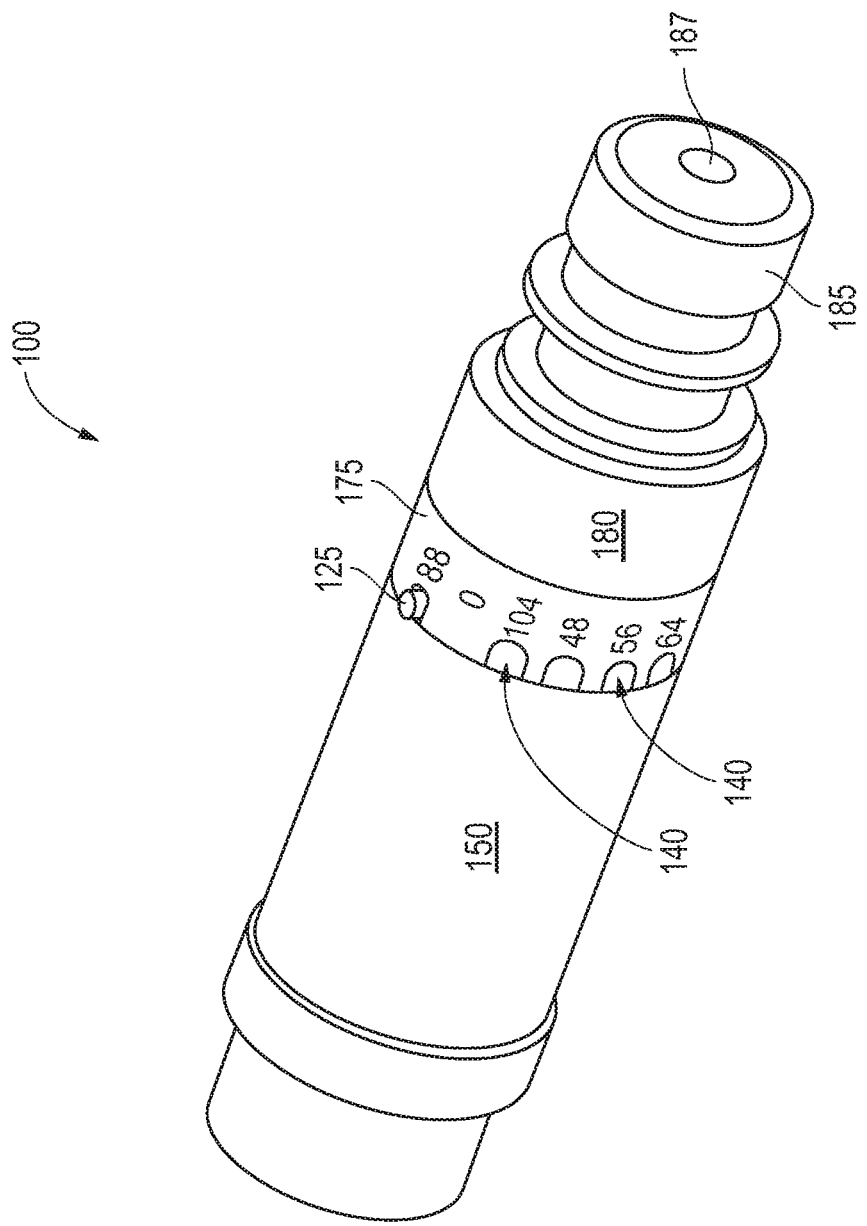
FIG. 1 is a perspective view of an embodiment of a weakpoint coupling having selectively adjustable load bearing capacity incorporated therein.

Referring now to FIG. 1, a perspective view of an embodiment of a weakpoint coupling 100 is shown. The coupling 100 includes an uphole housing portion 150 for coupling to a well access line such as the wireline 510 of FIG. 5. However, in other embodiments, this portion 150 may be coupled to a variety of other delivery line types such as coiled tubing, slickline, and others. Regardless, a downhole housing portion 180 is also incorporated into the coupling 100 for supporting connection to a downhole tool such as the logging tool 590 of FIG. 5. Further, similar to many conventional logging heads, the weakpoint coupling 100 is configured to allow for the controlled separation of the noted portions 150, 180 in certain circumstances. So, for example, should the logging tool 590 become stuck in debris 595, the wireline 510 may be removed from the well 580 without unnecessary damage to the tool 590 or breaking the line 590 (again see FIG. 5).

Unlike a conventional logging head, however, the weakpoint coupling 100 is equipped with a dial or key 175 which may be used in selecting and setting the amount of force required to achieve the above noted controlled separation. That is, without adding or removing any load bearing components to the weakpoint coupling 100, the key 175 may be rotated to a position corresponding with an operator's desired weakpoint threshold for the coupling 100. For example, as shown in FIG. 1, an operator has selected an 8,800 lb. load bearing threshold for the coupling 100 by rotating to the appropriate load selection slot 140 apparent at the exposed surface of the key 175. An indexing or set screw 125 is then threaded into the body of the coupling 100 and an 8,800 lb. load bearing capacity provided to the weakpoint coupling 100. Thus, once a force of about 8,800 lbs. is imparted on the coupling 100, for example from the uphole pull of a wireline 510, the coupling 100 will break, leaving the downhole housing portion 180 downhole as depicted in FIG. 5.

As application parameters dictate, a variety of thresholds may be selected (e.g. apart from the depicted 8,800 lbs.). For example, in shallower vertical wells, a smaller threshold may be warranted. On the other hand, in deeper wells with greater access challenges, a higher threshold may be set to avoid unintentional breaking of the coupling 100 due to the expected forces involved in carrying out the application. In the embodiment shown, the load threshold may be up to 10,400 lbs., at generally 800 lb. increments. However, a variety of different maximum thresholds and increments may be employed according to embodiments detailed further below.

Of course, as also detailed below, the manner in which the threshold or load bearing capacity is actually provided to the coupling 100 involves underlying components in communication with the key 175. That said, from the operator's standpoint, the user-friendliness of the weakpoint coupling 100 is quite noticeable in that little more than rotating of a key 175 and setting of a screw 125 is required to select the desired weakpoint threshold for the coupling 100.

Figure 5:
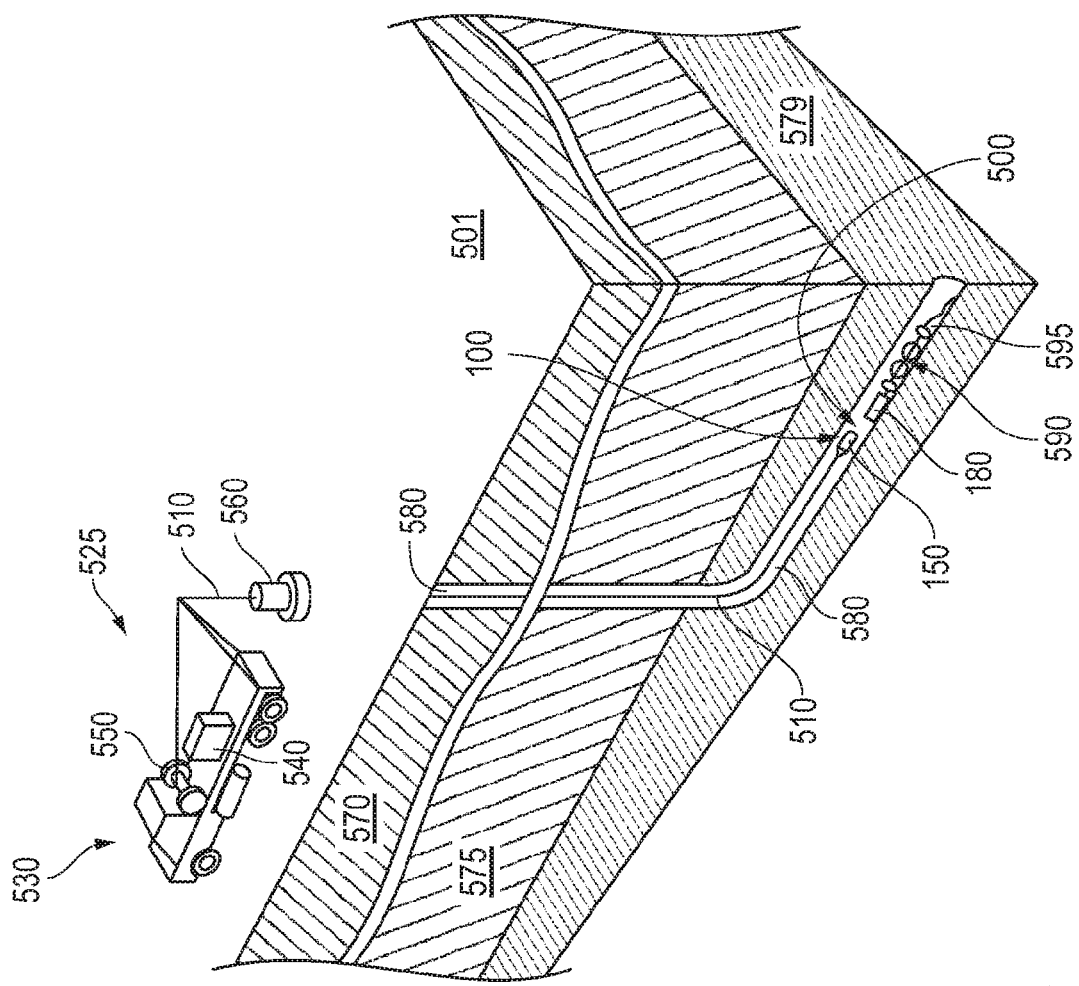
FIG. 5 is a perspective overview of an oilfield accommodating a well with the broken weakpoint coupling of FIG. 4 disposed therein.

Continuing with reference to FIG. 1, with added reference to FIG. 5, the downhole housing portion 180 includes an extension 185 configured to allow a downhole tool to be rotatably secured thereto. For example, where the tool is a logging tool 590 as described above, it may be secured to the coupling 100 in a manner which allows for a degree of rotation about an axis thereof This may be advantageous for advancement of such a tool 590 through a tortuous well 580. A continuous channel 187 may also be provided through each portion 150, 180, for example, to allow wired electrical coupling between the logging tool 590 and line 510. Of course, in other embodiments, such as coiled tubing applications, a channel 187 may be employed for fluid delivery, alternate power and/or communications or any number of other uses.

Figure 2:
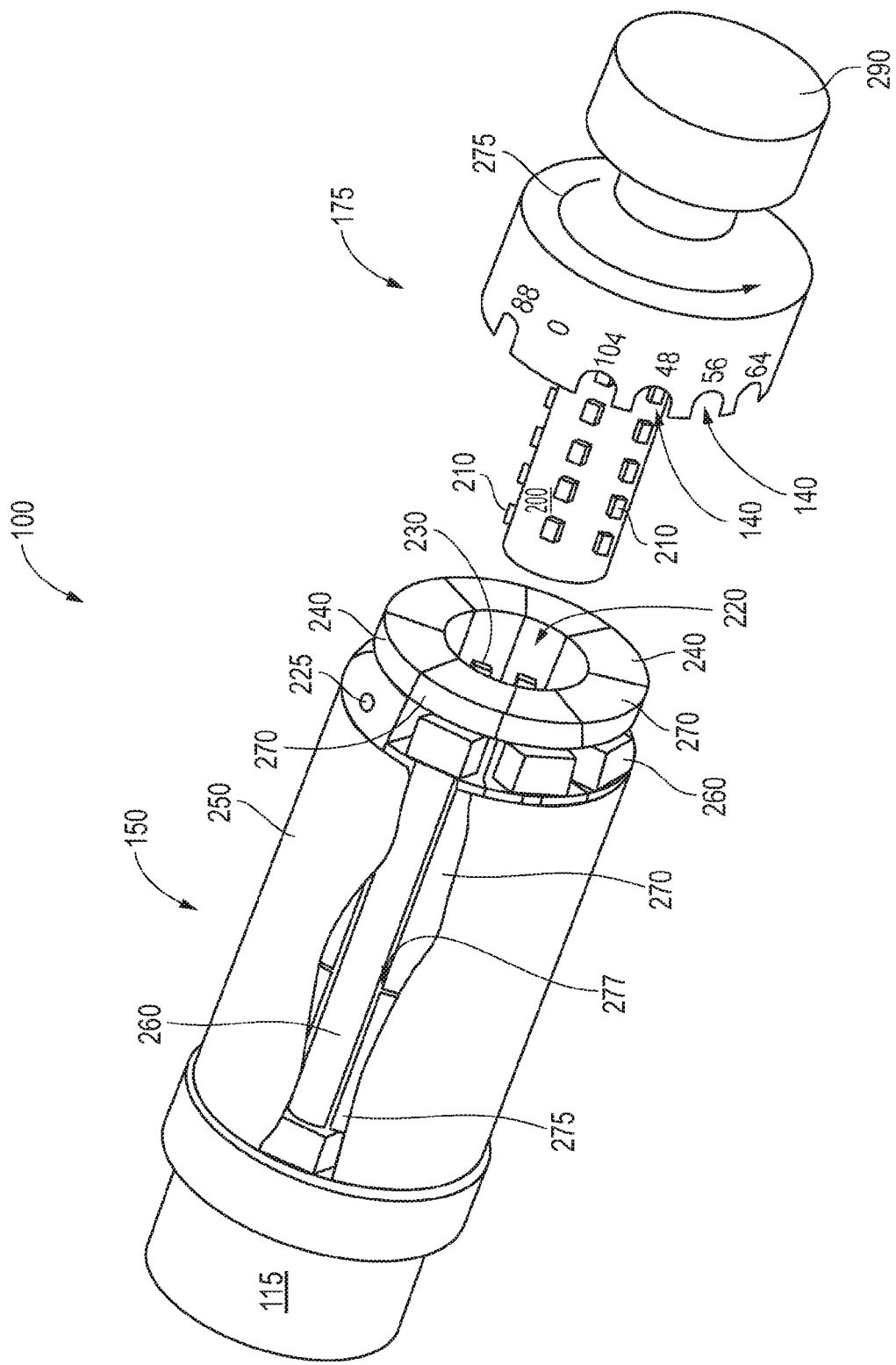
FIG. 2 is an exploded partially sectional view of the weakpoint coupling of FIG. 1 revealing a key thereof for interfacing a channel or slot thereof

With added reference to FIG. 2, the key 175 of the embodiment shown is depicted apart from the uphole housing portion 150 and remainder of the downhole housing portion 180. However, a head 290 for securing to other downhole structural features is shown. The key 175 is equipped with a shaft 200 for extending into the uphole housing portion 150, which in turn accommodates tensile members 260. However, in other embodiments, the key 175 and portions 150, 180 may be differently oriented relative to one another, such as with the key 175 incorporated into the uphole portion 150 and the tensile members 260 accommodated by the downhole portion 180. Regardless, as detailed further below, the key 175 is configured to regulate the amount of load bearing capacity provided to the weakpoint coupling 100 through the interface of its shaft 200 with selected tensile members 260.

Continuing with added reference to FIG. 2, in the embodiment depicted, the key 175 is labeled with abbreviated load threshold indicators such as "88" for 8,800 lbs. as indicated above. Along these lines, one of the positions at the face of the key 175 is labeled with a "0" and includes no corresponding selection slot 140. That is to say, prior to positioning of the set screw 125, the key 175 may be oriented to such a 'zero' position relative to the screw cavity 225 and the shaft 200 inserted into a key channel 220. The key channel 220 is defined by the uphole housing 150 and is equipped with a variety of interfacing tabs 230 for interfacing select key tabs 210 of the key 175. However, at the zero position, the shaft 200 of the key 175 is able to fully enter the channel 220 with all of the key tabs 210 bypassing all of the interfacing tabs 230.

The lack of interfacing between the tabs 210, 230 at the zero position also prevents the interlocking or creating of any engagement between the portions 150, 180. That is, the load bearing capacity of the coupling 100 is truly about zero. Thus, as detailed below, once the shaft 200 is inserted into the channel 220, the key 175 may be rotated, for example, to the 8,800 lb. load threshold position as indicated by arrow 275. As such, the set screw 125 may be inserted to hold the key 175 in position from a rotational standpoint. Additionally, as described below, the rotation of the key 175 to the noted position of FIG. 1, results in the interfacing of certain tabs 210, 230 and about 8,800 lbs. of tensile strength for holding the key 175 in position from an axial standpoint.

Figure 4:
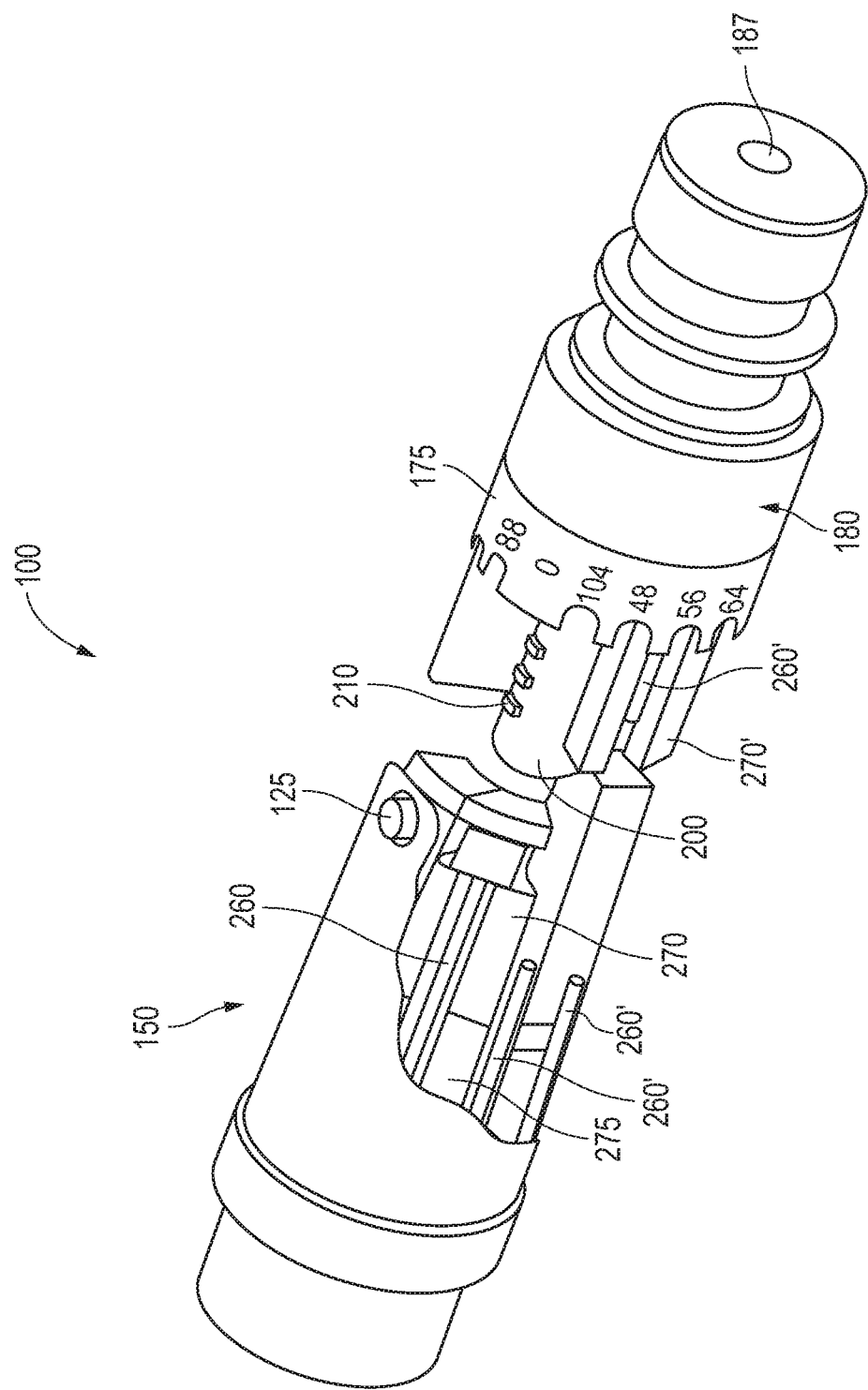
FIG. 4 is a perspective sectional view of the coupling of FIG. 1, broken according to a load bearing capacity selected by the interfacing of FIGS. 2 and 3.

Continuing with reference to FIG. 2, with added reference to FIG. 4, the coupling 100 is configured to undergo a controlled separation upon the imparting of a given axial load as described above. More specifically, a base 275 of the uphole housing 150 is configured to separate from the key 175 and certain engagable sections 270 of the housing 150 upon reaching the noted load threshold. Such a separation is visible with reference to FIG. 4.

Continuing with reference to FIG. 2, a retainer sleeve 250 of the housing 150 is partially cut away to reveal the underlying base 275 and engageable sections 270 noted above. Additionally, tensile members 260 are provided which may be employed to retain the engagable sections 270 relative the base 275. That is, as shown, a given tensile member 260 may be positioned within a common channel 277 defined by both the base 275 and corresponding section 270. Further, each tensile member 260 is anchored to the base 275. For example, a head of each member 260 may be located at either side of the channel 277, thereby providing the noted degree of retention for a given section 270 relative the base 275. More specifically, each tensile member 260 may be of an individual load bearing capacity or threshold, such that an axial load exceeding such capacity is required in order to break the given member 260. For example, in one embodiment, tensile members 260 may be rated 800 lb., 1,600 lb., and/or 3,200 lb.

Of course, the overall axial load required to achieve the above noted controlled separation is one which breaks all of the engaged tensile members 260. That is, each engaged tensile member 260 cumulatively contributes to the overall load bearing capacity of the coupling 100. As alluded to above and described further below, the interfacing of tabs 210, 230 based on key positioning is determinative of tensile member engagement. So, for example, in an embodiment where six tensile members 260 are available and five are engaged, an 8,800 lb. threshold may be set by engagement of three 1,600 lb. members 260, a 3,200 lb. member 260, and an 800 lb. member 260. Such an overall engagement may be achieved by rotation of the key 175 to a location where the tabs 210, 230 interface to engage five of the six members 260 as described. As noted above, such key positioning is marked from the user's vantage point as "88" (see FIG. 1).

In the embodiments shown herein, engagement of the tensile members 260 by the key 175 as described above is achieved through the engageable sections 270. Use of such intervening sections 270 between the key 175 and the members 260 may add a degree of practicality to the construction of the coupling 100. That is, an inner side of each section 270 may be particularly configured with interfacing tabs 230 while the outer surface is configured to accommodate a member 260. In this manner, the tensile members 260 may be of fairly monolithic and interchangeable construction without concern over intricate surface detail for interfacing key tabs 210 in order to achieve engagement. As a result, converting or customizing the max load capability of a given coupling 100 may simply be a matter of removing the retainer sleeve 250 and changing out interchangeable tensile members 260 without concern over interfacing of tabs 210, 230. Indeed, off-the-shelf couplings 100 may be readily available with adjustable thresholds of up to 10,400 lb., 17,600 lb., or a host of other maximums, any of which may be readily reconfigured as described here.

In the embodiment shown, up to six tensile members 260 and engageable sections 270 are employed. However, any practical number may be utilized, for example, to increase the overall possible load bearing maximum of the coupling 100 or to fine tune the incremental nature of adjustable threshold options. For example, in the 10,400 lb. embodiment described, additional tensile members 260 may be employed to reduce the user's load threshold options at the face of the key 175 to increments smaller than 800 lbs. Additionally, while six sections 270 are provided for accommodating tensile members 260, base extensions 240 which extend from the base 275 and help to define the key channel 220 are also provided adjacent certain sections 270. These extensions 240 are incorporated into the base 275 and provide an inner structural support. Indeed, the screw cavity 225 is provided through one such extension 240 and in the embodiment shown, all but two of the sections 270 are directly supported by such extensions 240.

Figure 3:
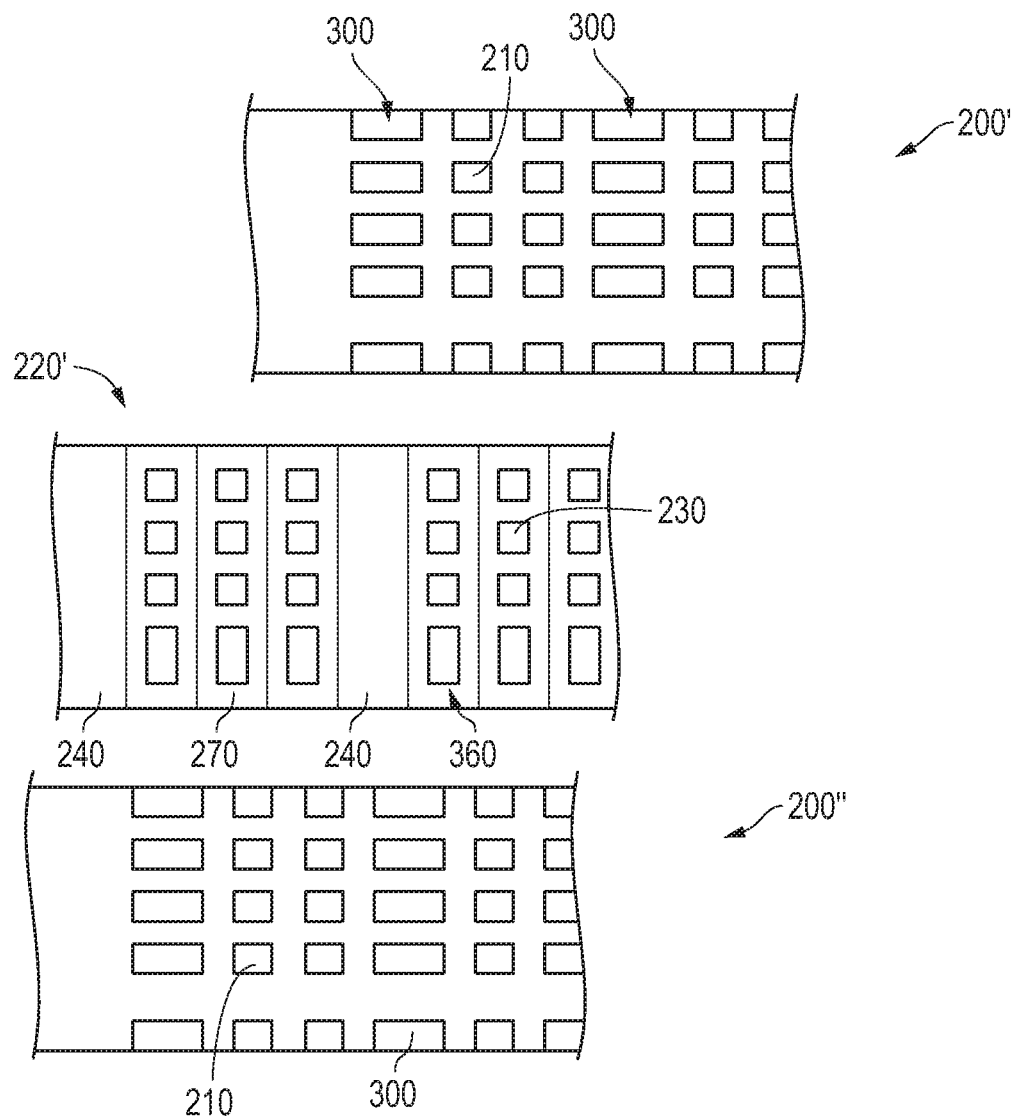
FIG. 3 is a schematic representation of a surface of a shaft of the key of FIG. 2 rotably interfacing a surface of the slot.

Referring now to FIG. 3, a schematic representation of the inner surface of the key channel 220' is shown oriented against different rotational positions 200', 200" of the key shaft 200 of FIG. 1. The schematic view is one where each surface 220', 200' (or 200") is examined rolled out flat. Thus, different rotational orientations of the key shaft 200', 200" in particular, may be examined as though moving horizontally relative to the key channel surface 220.

For example, in the uppermost depiction, as described above, the key shaft 200 may be oriented at a zero position 200' relative the key channel surface 220'. In this position 200', the shaft 200 of FIG. 2 may be fully inserted into the key channel 220. As noted above, this is due to the fact that each of the key tabs 210 of the shaft 200 bypasses each of the interfacing tabs 230 when the key 175 is in the zero position 200'. More specifically, each row 360 of interfacing tabs 230 at each engageable section 260 is completely avoided by each row 300 of key tabs 210 when the zero position is in play.

Continuing with reference to FIG. 3, once fully inserted into the key channel 220 of FIG. 2, the key 275 may be rotated. Thus, rows 360 of interfacing tabs 230 may adjustably and selectively become engaged by rows 300 of key tabs 210. Indeed, in the embodiment shown, the shaft 200 of FIG. 2 is rotated to a fully engaged position 200" where every row 360 is engaged. Thus, each section 270 and tensile member 260 is also engaged by the key 175. So, for example, in the embodiment described above, a 10,400 lb. load is provided to the coupling 100 when the fully engaged position 200" is in effect.

Of course, the coupling 100 of FIGS. 1 and 2 may be adjusted to a host of different load bearing capacities between the zero 200' and fully engaged 200" positions (i.e. depending upon the exact rotational position of the key 275). In one embodiment, this partial engagement positioning is achieved by utilizing key tab rows 300 of varying widths. In such an embodiment, key tabs 210 begin to interface rows 360 of interfacing tabs 230 as the shaft 200 of FIG. 2 is rotated out of the zero position 200'. However, as the shaft 200 continues to rotate, the variable width of the key tab rows 300 means that certain rows 300 will maintain engagement with the interfacing tabs 230 whereas others will not. As a result, a degree of selectable engagement, and thus selectively adjustable load bearing capacity, is provided to the coupling 100. In the embodiment shown herein, the variable width includes two of the six key tab rows 300 being twice the width of the others. However, in other embodiments, alternate variable width interfacing configurations may be employed in order to achieve such selectable engagement.

Referring now to FIG. 4, a perspective sectional view of the weakpoint coupling 100 is shown in a broken state following a controlled separation. As detailed above, this separation is guided by the load bearing capacity as set for the coupling 100 via the key 175. In this view, the separation of the uphole housing portion 150 from the key 175 and entire downhole housing portion 180 is apparent. What is also apparent is that certain tensile members 260 were not engaged via the shaft 200 and remain incorporated with the uphole housing 150 even after the separation. Other tensile members 260' on the other hand, have been broken apart by the separation. Indeed, upon examination of the shaft 200, the engagement of one of the sections 270' and a broken portion of a tensile member 260' can be seen. In fact, in the embodiment shown, a cumulative load of about 8,800 lbs. of tensile member breakage has been achieved in order to provide the separation (e.g. note the dialed "88" position of the key 175).

Referring now to FIG. 5, a perspective overview of an oilfield 501 is depicted. In this figure, a practical use of the weakpoint coupling 100 described above is depicted. Specifically, the coupling 100 is depicted in a well 580 as part of wireline operations. That is, a conventional wireline 510 may be employed in traversing various formation layers 570, 575, 579 to deliver the coupling 100, a logging tool 590 and other equipment downhole. For such an operation, relatively mobile surface equipment 525 such as a wireline truck 530, winch 550 and control unit 540 may be utilized in directing the line 510 through a well head 560 and into the well 580. In the embodiment shown, the well 580 presents challenges such as debris 595 and a deviated character. Thus, a tractor may also be employed in furthering downhole advancement and the nature of the operations alone may be expected to impart a significant amount of load on the line 510, coupling 100 and tool 590.

With a certain amount of operational load to be expected, line load bearing capacity may be carefully considered when selecting a wireline 510 for the depicted operations. By the same token, the adjustable load bearing capacity of the coupling 100 may be set as detailed above so as to allow for a controlled separation or breaking 500 once expected operational load is substantially exceeded. So, for example, when a tool 590 becomes stuck in debris 595 during attempted removal of the line 510 by the winch 550, the resultant spike in load/tension may result in breaking 500 of the coupling 100. As such, the uphole housing portion 150 of the coupling 100 and the entire wireline may be fully removed from the well 580, leaving only the downhole housing portion 180 and further downhole tools behind for later retreival.

Figure 6:
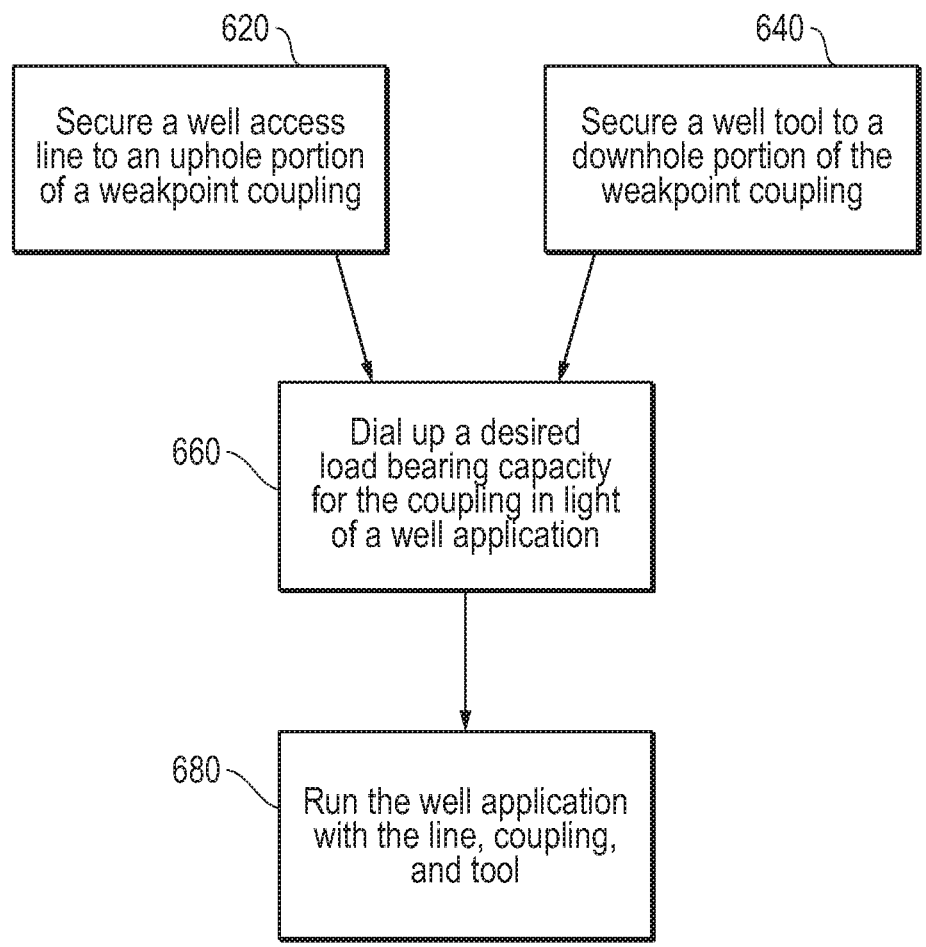
FIG. 6 is a flow-chart summarizing an embodiment of employing a weakpoint coupling of selectively adjustable load bearing capacity.

Referring now to FIG. 6, a flow-chart summarizing an embodiment of employing a weakpoint coupling is shown from the operator's perspective. That is, a coupling of selectively adjustable load bearing capacity is provided. Thus, the operator may dial up a desired load bearing capacity as indicated at 660 by rotation of the coupling key as detailed hereinabove. The selected load bearing capacity may be chosen based on parameters of a given well application and the types of loads which may be expected over the course of the application.

The application may involve the use of a well tool deployed via a well access line such as the above described wireline. Thus, as indicated at 620 and 640 such features may be secured to the coupling. That said, without any need for the operator to add or remove load bearing features to the coupling, the load bearing capacity may be selected as indicated at 660 and an application run in the well as indicated at 680. Should the tool or other equipment downhole of the coupling become stuck, the selected load bearing capacity may be exceeded, the coupling broken and the entire line retrieved from the well.

Embodiments detailed herein allow for adjustability in establishing a load threshold for a weakpoint head or coupling. Not only is the threshold adjustable, but such adjustability may be attained without the need to for having a variety of tensile members available for change-out. Thus, user-friendliness of the coupling is enhanced and the likelihood of an operator leaving behind a tensile member of desired load bearing rating is eliminated.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, features such as exclusion pins may be employed within the base or engagable sections so as to direct accommodation of the tensile members or the interfacing of the base and noted sections. Furthermore, the foregoing description should not be read as pertaining only to the precise structures described and shown in the accompanying drawings, but rather should be read as consistent with and as support for the following claims, which are to have their fullest and fairest scope.

I claim:

1. A weakpoint coupling for a downhole tool, the coupling comprising:
   a first portion for accommodating a plurality of tensile members; and
   a second portion for selective engagement of a combination of the tensile members to provide one of a variety of different load bearing capacities to the coupling without adding or removing any tensile members and wherein at least one combination of the tensile members comprises engagement of less than all of the plurality of tensile members.

2. The weakpoint coupling of claim 1 wherein said first portion is an uphole portion for securing to a well access line and said second portion is a downhole portion for coupling to the downhole tool.

3. The weakpoint coupling of claim 1 wherein one of the tensile members is of a given load bearing capacity different from that of another tensile member.

4. The weakpoint coupling of claim 1 wherein said second portion comprises a key with a rotatable exposed surface for manually attaining the selective engagement.

5. The weakpoint coupling of claim 4 further comprising:
   a base and a plurality of engageable sections of the first portion for defining a key channel thereof; and an internal shaft of the key for insertion into the channel, the selective engagement of the tensile members attained through said sections.

6. The weakpoint coupling of claim 5 wherein each tensile member is anchored to said base and one of said sections.

7. The weakpoint coupling of claim 5 further comprising:
   an extension of said base with a screw cavity thereinto; a plurality of selection slots at the exposed surface for rotatable alignment over the screw cavity; and a set screw for partial insertion into the cavity through one of said slots to prevent key rotation.

8. The weakpoint coupling of claim 5 further comprising:
   rows of interfacing tabs at surfaces of said sections defining the key channel; and rows of key tabs at an exterior surface of said shaft to selectively interface said rows of interfacing tabs for the selective engagement.

9. The weakpoint coupling of claim 8 wherein the combination of selectively engaged tensile members comprises no engaged tensile members with the key at a zero position where none of said rows of key tabs interface any of said rows of interfacing tabs.

10. The weakpoint coupling of claim 8 wherein the combination of selectively engaged tensile members comprises engagement of each tensile member with the key at a fully engaged position where each of said rows of key tabs interfaces a row of said interfacing tabs.

11. The weakpoint coupling of claim 8 wherein the combination of selectively engaged tensile members comprises engagement of a portion of said tensile members with the key at a partial engagement position where at least one of said rows of key tabs interfaces at least one of said rows of interfacing tabs and at least one other of said rows of key tabs avoids interface with any of said rows of interfacing tabs.

12. A downhole tool assembly for use in a well, the assembly comprising:
   a well access line;
   a weakpoint coupling comprising a plurality of load bearing components and secured to said well access line, said coupling defining a plurality of increments of load bearing capacity thresholds, the increments selectable without a change in an amount of the components; and
   a downhole tool secured to said coupling.

13. The downhole tool assembly of claim 12 wherein the components comprise a plurality of elongated tensile members.

14. The downhole tool assembly of claim 12 wherein said well access line is one of a wireline, coiled tubing and slickline.

15. The downhole tool assembly of claim 12 wherein the downhole tool is a logging tool.

16. The downhole tool assembly of claim 12 further comprising surface equipment to impart a load on said coupling via said line in an event of said tool becoming stuck in the well, the load in excess of a selected load bearing capacity for said coupling to achieve a controlled separation thereof.

17. The downhole tool assembly of claim 12 wherein the load bearing capacity threshold is selected by engaging at least one of the plurality of load bearing components to set the load bearing capacity threshold of the weakpoint coupling.

18. A method of employing a weakpoint coupling, the method comprising selectively adjusting a load bearing capacity thereof, the coupling having a given amount of load bearing components, said adjusting achieved without change to the given amount, wherein said adjusting comprises dialing a load bearing capacity for the coupling with a rotatable key thereof.

19. The method of claim 18 further comprising:
   orienting the rotatable key to a zero position; and inserting a shaft of the key into a key channel of an uphole portion of the coupling for assembly thereof prior to said dialing.

20. The method of claim 19 further comprising immobilizing the rotatable key to prevent further rotation thereof after said dialing.

21. The method of claim 20 further comprising:
   securing a well access line to the uphole portion of the coupling; and
   securing a well tool to a downhole portion of the coupling.

22. The method of claim 21 further comprising:
   deploying the tool into a well with the line; and
   running an application in the well with the tool.

* * * * *